UNITED STATES PATENT OFFICE.

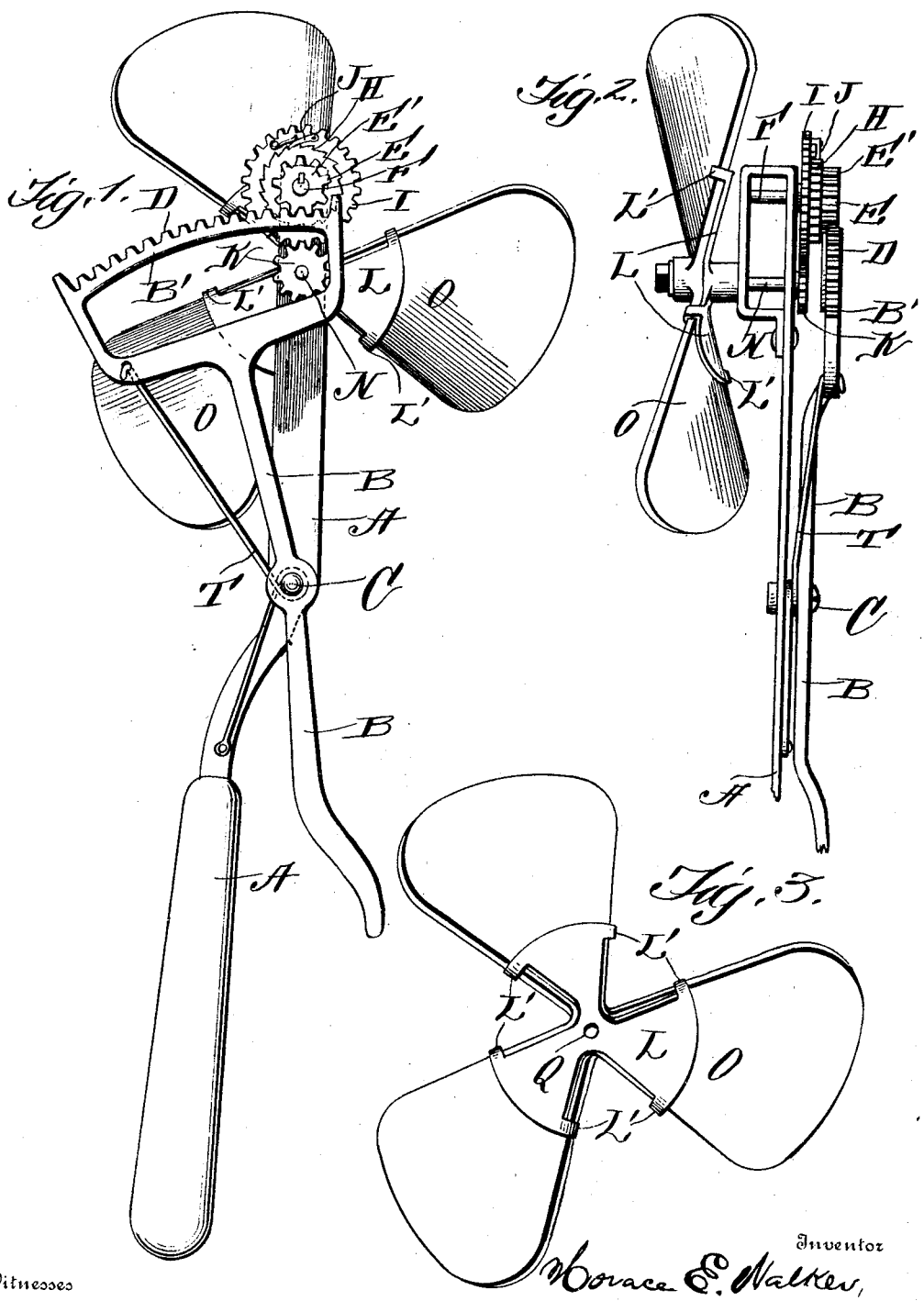

HORACE EDWARD WALKER, OF DETROIT, MICHIGAN.

FAN.

No. 896,492.  Specification of Letters Patent.  Patented Aug. 18, 1908.

Application filed April 16, 1908. Serial No. 427,419.

*To all whom it may concern:*

Be it known that I, HORACE E. WALKER, a citizen of the United States, residing at Detroit, in the county of Wayne and State of Michigan, have invented certain new and useful Improvements in Fans; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fans and comprises various details of construction, combinations and arrangements of parts which will be hereinafter fully described and then specifically defined in the appended claims.

My invention is illustrated in the accompanying drawings, in which:—

Figure 1 is a plan view of my improved fan. Fig. 2 is a sectional view longitudinally through the same, and Fig. 3 is an enlarged detail view of the fan blades.

Reference now being had to the details of the drawings by letter, A and B designate two handles connected together by means of a pivot C. One of said handles B has a flaring end B' with teeth D along the end thereof designed to mesh with the teeth E of a pinion wheel E', which latter is mounted upon a pivot F carried by the handle A. Fixed to rotate with the pinion E is a ratchet wheel H, and I is a gear wheel which is mounted upon the pivot F and carries a pawl J designed to engage the teeth of the ratchet wheel H. The gear wheel I is in mesh with a pinion wheel K adapted to be driven in one direction and said wheel K has a fixed shaft N mounted in said handle A and to which the fan O is fastened. An auxiliary fan, designated by letter L and made of a suitable material, has arms L' adapted to engage over the arms of the fan O, and said auxiliary fan has a central aperture Q adapted to receive the shaft upon which the fan O is mounted.

A spring T is coiled about the pivot C and one end is fastened to the handle A while the other is fastened to the handle B in the manner shown clearly in the drawings, the purpose of said spring being to normally return the handles to their starting position after having been pressed together by the hand of an operator.

The operation of my fan will be readily understood and is as follows:—The parts are normally held by the spring in the position shown in Fig. 1 of the drawings. As the two handles are brought together under tension of the spring T, a rotary movement through the gear mechanism shown is imparted to the shaft carrying the fan wheel. By releasing the grip upon the handles, the spring will normally return the latter to their starting positions, the pawl riding idly over the ratchet teeth and, by successively gripping the handles, bringing together and releasing the same, a continuous and rapid rotary movement will be imparted to the fan.

What I claim to be new is:—

In combination with a stationary handle, a shaft mounted thereon, a fan journaled upon said shaft, a pivotal handle mounted upon the stationary handle and having a widened portion with a series of rack teeth along the end thereof, gear mechanism actuated by said rack teeth for rotating the fan, a wire fastened at one end to the handle coiled about the pivot between the two handles and secured to the widened portion of the handle with gear teeth at the end thereof, a reinforcing member mounted upon the fan shaft and having radial wings, fingers projecting from the edges of said wings and adapted to engage over the wings of the frame, as shown and described.

In testimony whereof I hereunto affix my signature in the presence of two witnesses.

HORACE EDWARD WALKER.

Witnesses:
  WILLIAM C. SWAN,
  JOSEPHINE WALKER.